(12) United States Patent
Lee et al.

(10) Patent No.: US 12,364,330 B2
(45) Date of Patent: Jul. 22, 2025

(54) PULL-OUT SYSTEM

(71) Applicant: SEGOS CO., LTD., Incheon (KR)

(72) Inventors: Doo Myun Lee, Incheon (KR); Ro Hee Lee, Seoul (KR); Sai Ryun Kim, Incheon (KR); Byeol Kim, Seoul (KR)

(73) Assignee: SEGOS CO., LTD., Incheon (KR)

( * ) Notice: Subject to any disclaimer, the term of this patent is extended or adjusted under 35 U.S.C. 154(b) by 121 days.

(21) Appl. No.: 18/266,320

(22) PCT Filed: Dec. 9, 2021

(86) PCT No.: PCT/KR2021/018607
§ 371 (c)(1),
(2) Date: Jun. 9, 2023

(87) PCT Pub. No.: WO2022/124809
PCT Pub. Date: Jun. 16, 2022

(65) Prior Publication Data
US 2024/0026924 A1    Jan. 25, 2024

(30) Foreign Application Priority Data

Dec. 10, 2020 (KR) ........................ 10-2020-0172340

(51) Int. Cl.
*A47B 88/447* (2017.01)
*A47B 88/493* (2017.01)
*F16C 29/04* (2006.01)

(52) U.S. Cl.
CPC .......... *A47B 88/447* (2017.01); *A47B 88/493* (2017.01); *F16C 29/04* (2013.01); *A47B 2210/0072* (2013.01); *A47B 2210/0075* (2013.01); *F16C 2314/72* (2013.01)

(58) Field of Classification Search
CPC ..... A47B 88/447; A47B 88/49; A47B 88/493; A47B 2210/0072; A47B 2210/0075; F16C 29/02; F16C 2314/72; F16C 29/04
See application file for complete search history.

(56) References Cited

U.S. PATENT DOCUMENTS

| 8,152,250 | B2 | 4/2012 | Aguilar Ante et al. |
| 9,277,816 | B2 | 3/2016 | Chen |
| 9,675,174 | B2 | 6/2017 | Jahrling et al. |
| 2009/0261698 | A1* | 10/2009 | Cabal Velarde ..... A47B 88/493 312/334.1 |

(Continued)

FOREIGN PATENT DOCUMENTS

| CN | 103126355 A | 6/2013 |
| CN | 106724189 A | 5/2017 |

(Continued)

OTHER PUBLICATIONS

WO2018133431A1_DESCRIPTION.*

(Continued)

*Primary Examiner* — Phillip A Johnson
(74) *Attorney, Agent, or Firm* — Sughrue Mion, PLLC (57) ABSTRACT

An embodiment of the present invention provides a pull-out system comprising: at least two slide rails each having a fixed rail, an intermediate rail slidably disposed on the fixed rail, and a moving rail slidably disposed on the intermediate rail; and a synchronization means for synchronizing movements of the respective slide rails with each other.

10 Claims, 9 Drawing Sheets

(56) References Cited

U.S. PATENT DOCUMENTS

| | | | |
|---|---|---|---|
| 2010/0219727 A1 | 9/2010 | Aguilar Ante et al. | |
| 2012/0237144 A1 | 9/2012 | Gasser | |
| 2013/0129266 A1 | 5/2013 | Chen | |
| 2013/0249367 A1 | 9/2013 | Chen | |
| 2016/0128475 A1 | 5/2016 | Jahrling et al. | |
| 2016/0146533 A1 | 5/2016 | Jung | |
| 2017/0086584 A1* | 3/2017 | Rehage | A47B 88/473 |
| 2017/0184151 A1 | 6/2017 | Huang | |
| 2018/0317653 A1* | 11/2018 | Xu | A47B 88/477 |

FOREIGN PATENT DOCUMENTS

| | | | | |
|---|---|---|---|---|
| JP | 2016-521615 A | 7/2016 | | |
| KR | 10-2010-0064581 A | 6/2010 | | |
| KR | 10-2013-0056200 A | 5/2013 | | |
| KR | 10-2013-0109073 A | 10/2013 | | |
| KR | 10-2018-0010559 A | 1/2018 | | |
| KR | 10-2020-0109081 A | 9/2020 | | |
| WO | WO-2018133431 A1 * | 7/2018 | | A47B 88/40 |
| WO | WO-2019074271 A1 * | 4/2019 | | A47B 88/437 |

OTHER PUBLICATIONS

International Search Report for PCT/KR2021/018607 dated Mar. 24, 2022 (PCT/ISA/210).
Extended European Search Report dated Mar. 28, 2024 in Application No. 21903855.1.
Office action issued on Jan. 9, 2024 for related Chinese patent application (Appln. No. 202190000922.6).

* cited by examiner

PULL-OUT SYSTEM

CROSS REFERENCE TO RELATED APPLICATIONS

This application is a National Stage of International Application No. PCT/KR2021/018607 filed Dec. 9, 2021, claiming priority based on Korean Patent Application No. 10-2020-0172340 filed Dec. 10, 2020, the entire disclosures of which are incorporated herein by reference.

TECHNICAL FIELD

The present invention relates to a pull-out system, and more specifically, to a pull-out system installed between a main body and an accommodation body so that an opening or closing operation of the accommodation body is performed softly and smoothly.

BACKGROUND ART

Generally, drawer assemblies are installed in mounting structures such as refrigerators, dishwashers, ovens, drawers, and the like in order for withdrawing or inserting objects.

Slide rails are provided in such a drawer assembly so that a drawer can be easily withdrawn from a mounting structure and returned to its original position. Further, since a rolling part is provided on the slide rail in a ball or roller shape, the drawer can be moved more smoothly when being slid, and thus user convenience can be improved.

Typically, a slide rail is composed of a fixed rail fixed to a wall surface surrounding a space in which a drawer is installed, and one or more moving rails slidably installed with respect to the fixed rail. Therefore, the moving rails slide along the fixed rail, and thus the drawer can be easily withdrawn or inserted.

Meanwhile, since slide rails at both sides of a drawer are not constrained to each other and operate individually, problems, such as the attitude of the drawer being distorted so that more force is required for being withdrawn or inserted, noise being generated due to the jamming operation, and the like, occur when there is a difference in movement amount between the slide rails at both sides.

Accordingly, in order to solve the above problems, necessity of a synchronization part for reducing a difference in movement amount between slide rails at both sides and enabling smooth movement has increased.

RELATED ART DOCUMENT (Patent Document 1) Korean Laid-open Patent Publication No. 10-2018-0010559 (Jan. 31, 2018)

DISCLOSURE

Technical Problem

The present invention is directed to solving the problems of the related art described above and providing a pull-out system which includes at least two slide rails having a fixed rail, an intermediate rail, and a moving rail, and a synchronization part for synchronizing movements of the slide rails.

Technical Solution

One aspect of the present invention provides a pull-out system which includes at least two slide rails each having a fixed rail, an intermediate rail slidably disposed on the fixed rail, and a moving rail slidably disposed on the intermediate rail, and a synchronization part configured to synchronize movement of each of the moving rails.

The synchronization part may include a rack gear installed on each fixed rail, a pinion gear rotatably installed on one side surface of each intermediate rail and engaged with the rack gear, and a synchronization bar of which one end portion and the other end portion are connected to the pinion gear.

The rack gear may include a tension unit having an incised portion and configured to vertically elastically move a predetermined distance, and when the slide rails at both sides are not synchronized, the tension unit may cause idling of the pinion gear at one side during insertion, so that synchronization realignment is performed.

The tension unit may be formed in an "L" shape by cutting a portion of an end of the rack gear in an inserting direction.

The pull-out system may further include a roller rotatably fastened to one side surface of the intermediate rail, and at least one wire part of which an end of one side is fixed to the moving rail and an end of the other side is fixed to the fixed rail and which is disposed to surround a rotation shaft of the pinion gear or the roller.

The pinion gear may include a first pinion member fixed to the intermediate rail, and a second pinion member of which one side is coupled to the first pinion member and the other side is coupled to the synchronization bar.

A gear may be formed along a perimeter of at least one of the first pinion member and the second pinion member.

A guide slit around which the wire part is wound may be provided between the first pinion member and the second pinion member.

The rack gear may further include a rail insertion part formed on one end portion in the inserting direction to be fitted into and mounted on the fixed rail.

The rack gear may include a first rack gear and a second rack gear separated from each other, and the tension unit may be formed so that one side is connected to the first rack gear or the second rack gear and a part of a lower portion is incised.

Advantageous Effects

According to one aspect of the present invention, a pull-out system includes a synchronization part easily attached to and detached from slide rails, and thus assembly convenience and productivity can be improved.

Further, the pull-out system includes a tension unit, and thus when the slide rails at both sides are not synchronized, the tension unit can cause idling of a pinion gear at one side during insertion so that synchronization realignment is performed.

In addition, it is possible to reduce a moving distance of an intermediate rail while maintaining a maximum moving distance of a moving rail, thereby reducing manufacturing costs of parts.

Effects of the present invention are not limited to the above-described effects, and it should be understood that all possible effects deduced from a configuration of the present invention described in detailed descriptions and the claims are included.

MODES OF THE INVENTION

Hereinafter, the present invention will be described with reference to the accompanying drawings. However, embodiments of the present invention may be implemented in several different forms and are not limited to embodiments described herein. In addition, parts irrelevant to description are omitted in the drawings in order to clearly explain the present invention. Similar parts are denoted by similar reference numerals throughout this specification.

In addition, throughout this specification, when a part is referred to as being "connected" to another part, it includes "directly connected" and "indirectly connected" via an intervening part. Also, when a certain part "includes" a certain component, this does not exclude other components from being included unless described otherwise, and other components may in fact be included.

Hereinafter, embodiments of the present invention will be described in detail with reference to the accompanying drawings.

Figure 1:
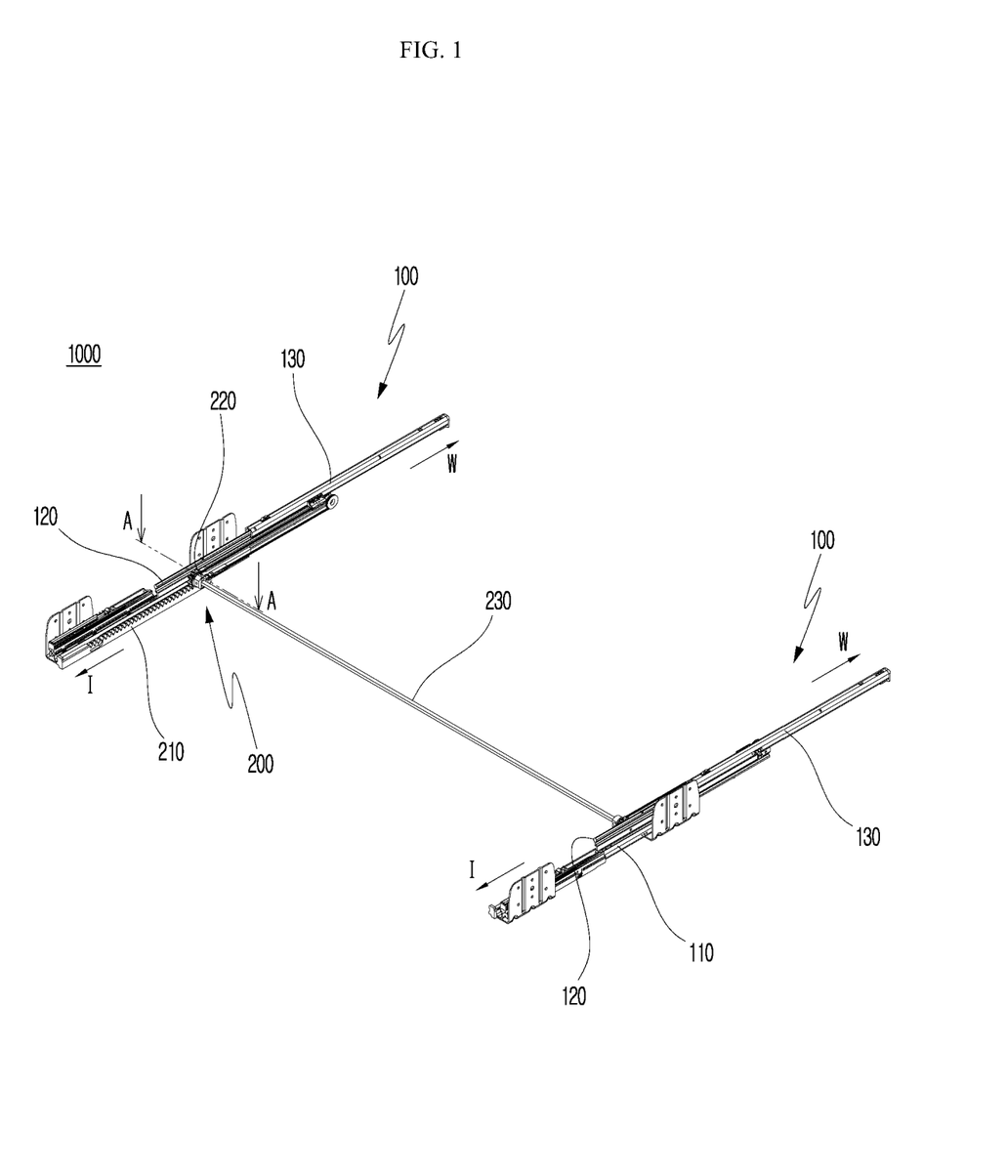
FIG. 1 is a perspective view of a pull-out system according to an embodiment of the present invention.
Figure 2:
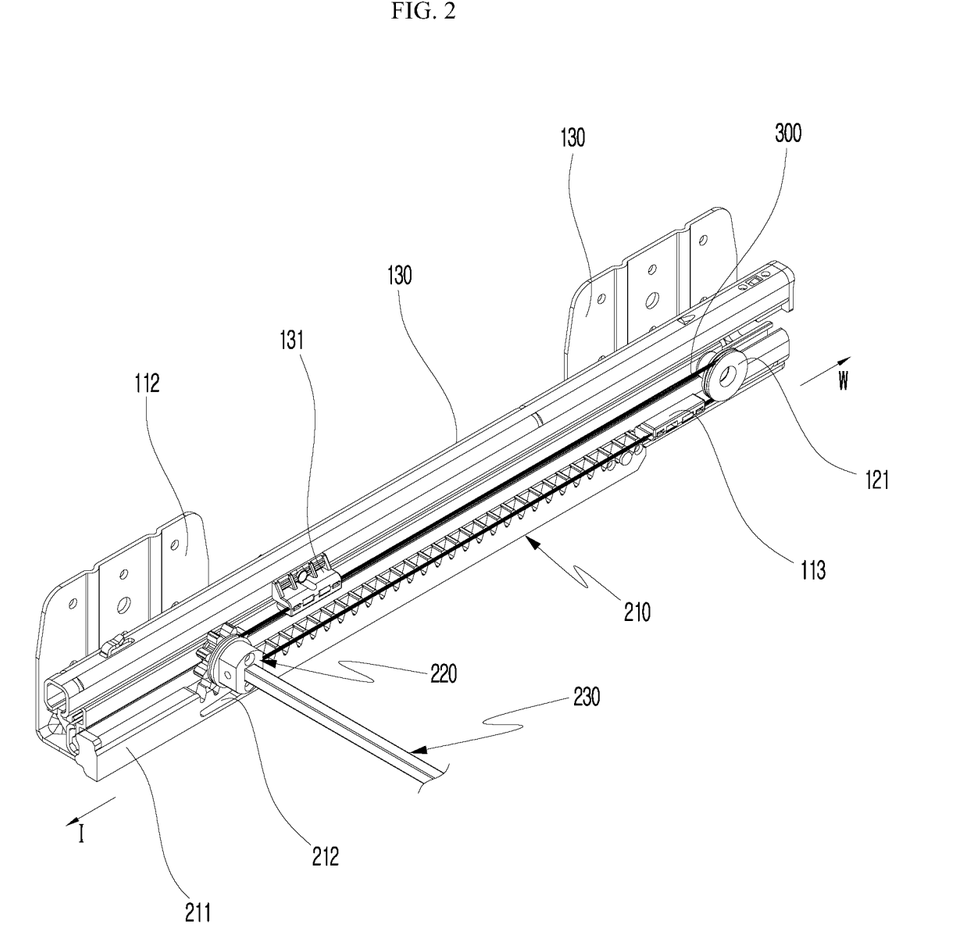
FIG. 2 is a perspective view of a slide rail at one side according to an embodiment of the present invention.
Figure 3:
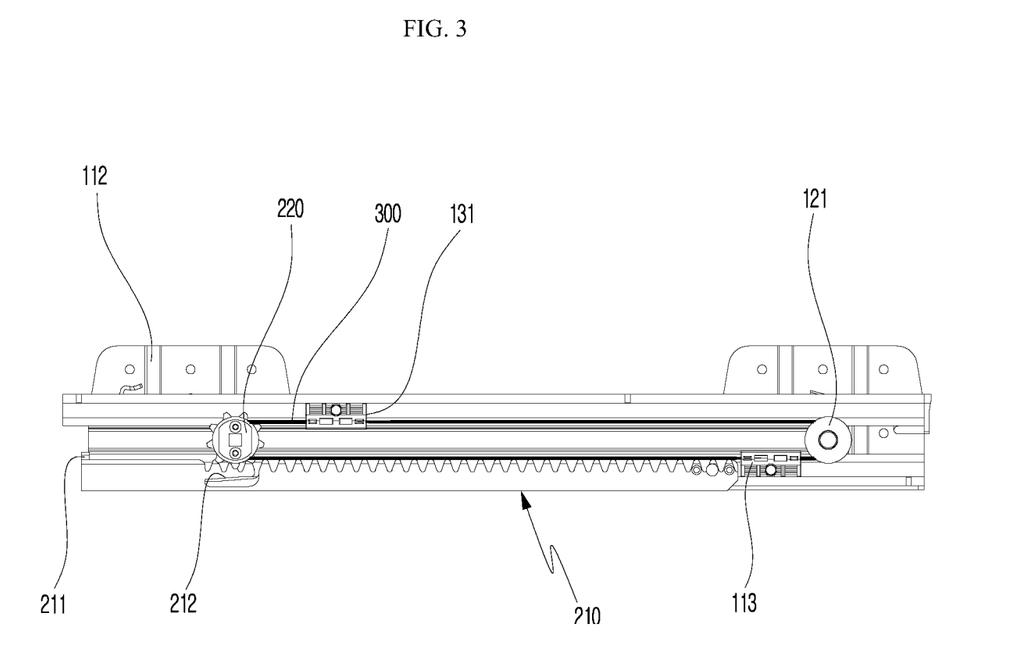
FIG. 3 is a side view of the slide rail at one side according to an embodiment of the present invention.

FIG. 1 is a perspective view of a pull-out system according to an embodiment of the present invention, FIG. 2 is a perspective view of a slide rail at one side according to the embodiment of the present invention, and FIG. 3 is a side view of the slide rail at one side according to the embodiment of the present invention.

Referring to FIGS. 1 to 3, a pull-out system 1000 of the present invention includes a pair of slide rails 100 and a synchronization part 200 detachably provided on the slide rails 100 to synchronize movements of the slide rails 100.

The slide rails 100 each include a fixed rail 110 fixed to a sidewall of a mounting structure such as a drawer, a dishwasher, a refrigerator, or the like through a bracket 112, and a moving rail 130 slidably provided on the fixed rail 110. Therefore, the slide rail 100 is formed in a structure in which an object is withdrawn or inserted while the moving rail 130 slides to one side or the other side as needed by a user.

Meanwhile, the slide rail 100 may further include an intermediate rail 120 slidably provided between the fixed rail 110 and the moving rail 130. More specifically, the intermediate rail 120 and the moving rail 130 are rails which move, the intermediate rail 120 may be slidably installed on the fixed rail 110, and the moving rail 130 may be slidably installed on the intermediate rail 120.

As a result, since relative movement of the moving rail 130 is possible on the intermediate rail 120 that has relatively moved with respect to the fixed rail 110, a length of the slide rail 100 may be increased as necessary. Therefore, the slide rail 100 can be used for drawers of various sizes.

Further, a rolling part such as a ball, a roller, or the like is provided between the fixed rail 110 and the intermediate rail 120 and between the intermediate rail 120 and the moving rail 130, and thus a frictional force between the rails can be reduced and more smooth sliding movement can be achieved.

Meanwhile, the synchronization part 200 for synchronizing movements of the slide rails 100 at both sides may be detachably provided in the pull-out system 1000.

The synchronization part 200 is mounted on the slide rails 100 at both sides and connected to the slide rails 100 through a synchronization bar 230 which will be described below, to synchronize the movements of the slide rails 100 so that when the slide rail 100 at one side performs an opening operation, the slide rail 100 on the other side also performs an opening operation, and when the slide rail 100 at one side performs a closing operation, the slide rail 100 on the other side also performs a closing operation.

Figure 4:
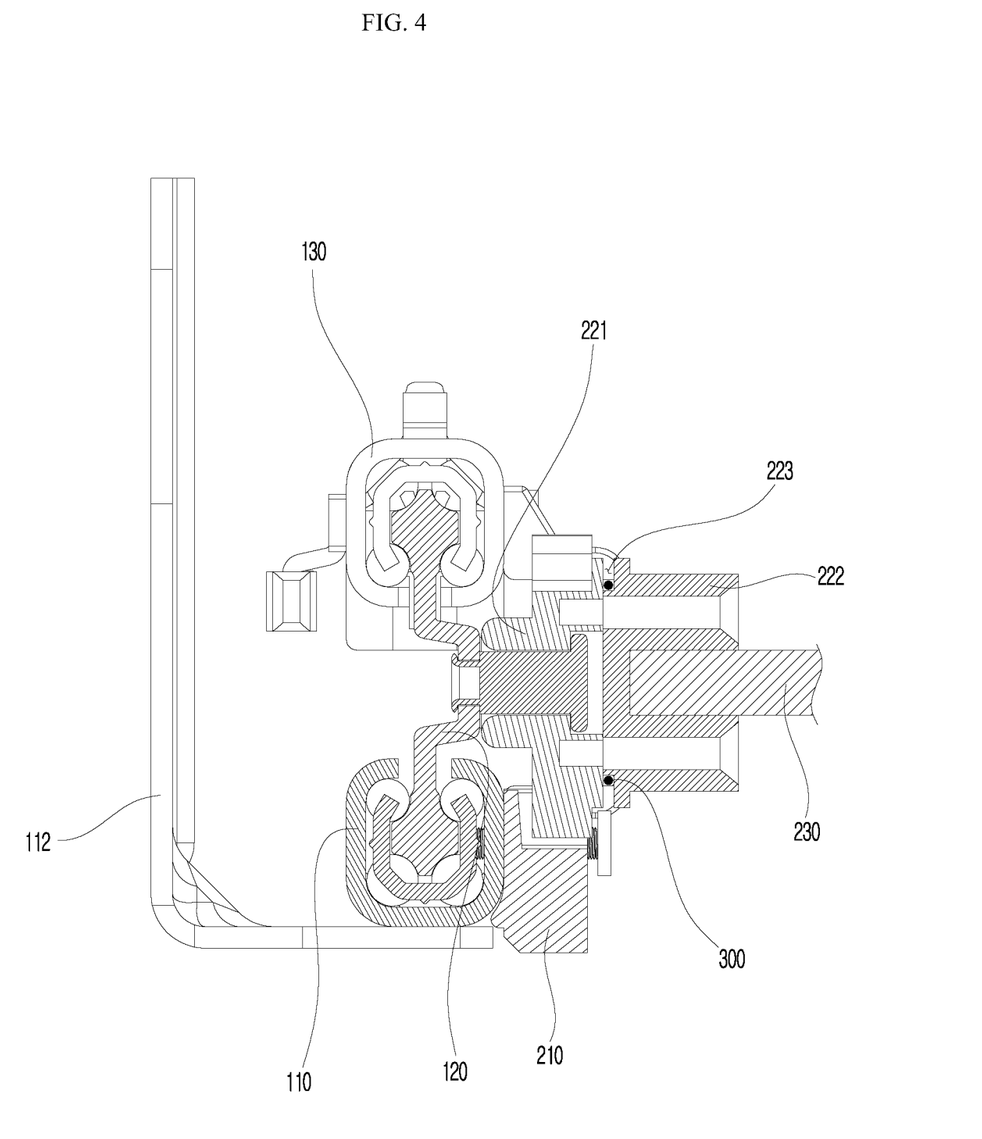
FIG. 4 is an exploded perspective view of a rack gear according to an embodiment of the present invention.
Figure 5:
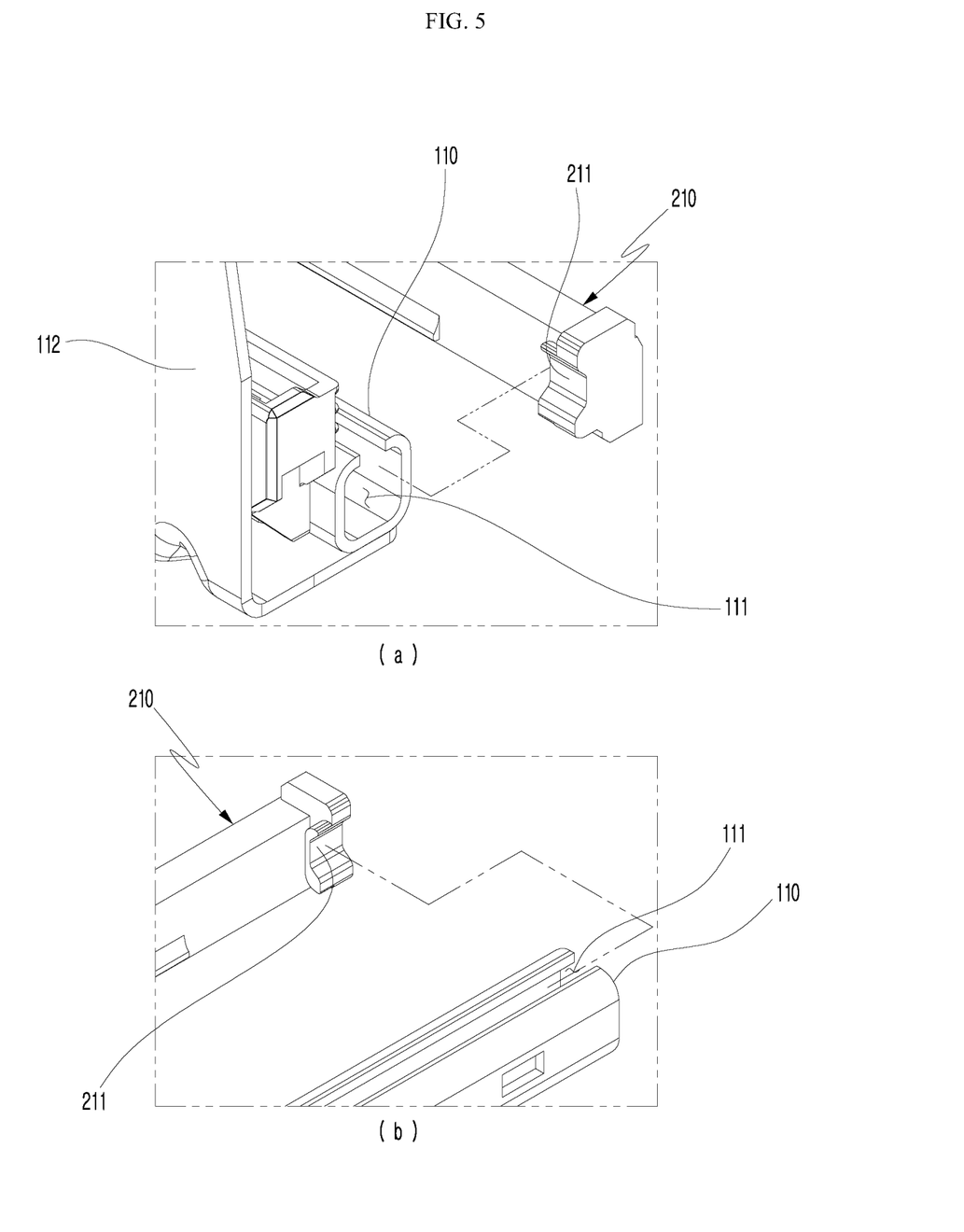
FIG. 5 is a set of exploded perspective views of a pinion gear according to an embodiment of the present invention.
Figure 6:
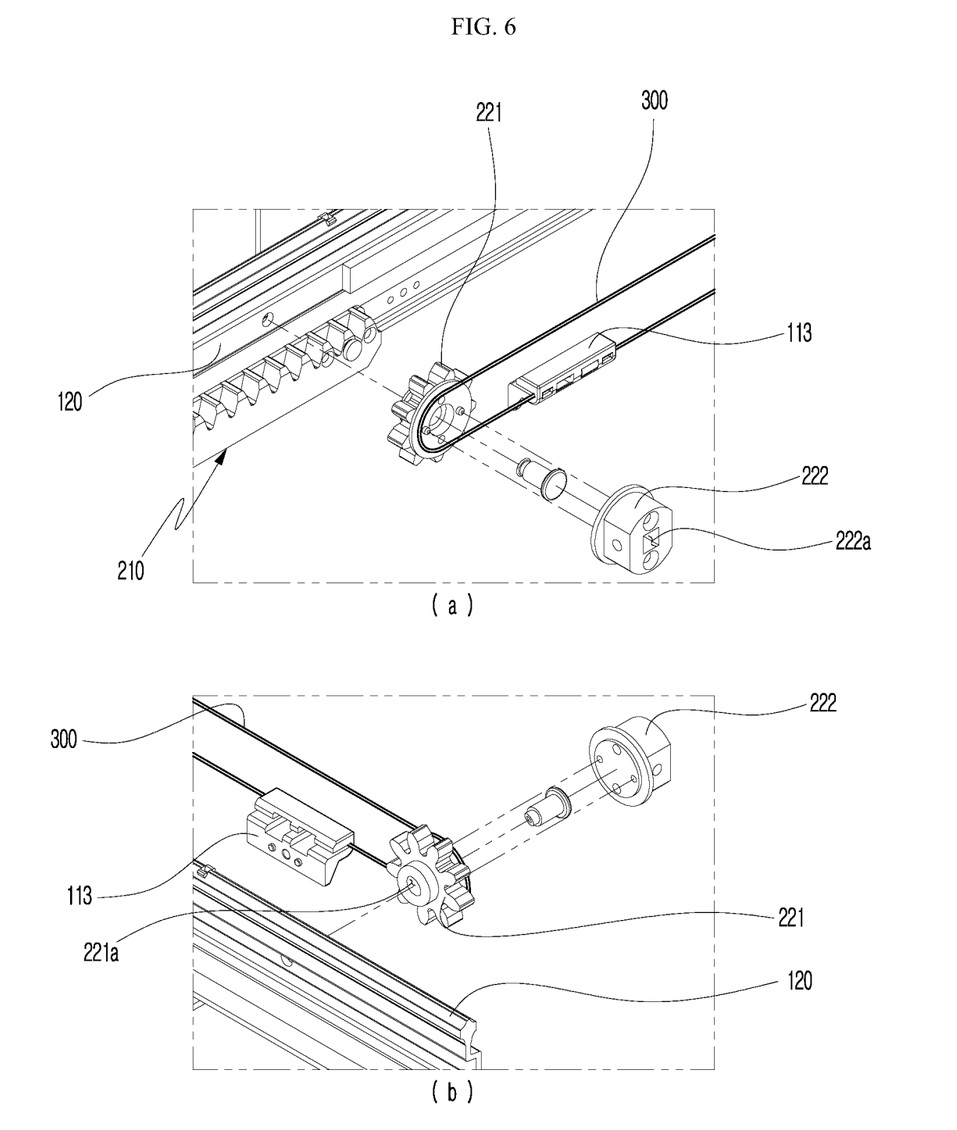
FIG. 6 is a set of cross-sectional views of the pull-out system along line A-A of FIG. 1.

FIG. 4 is an exploded perspective view of a rack gear according to the embodiment of the present invention, FIG. 5 is a set of exploded perspective views of a pinion gear according to the embodiment of the present invention, and FIG. 6 is a set of cross-sectional views of the pull-out system along line A-A of FIG. 1.

Referring to FIGS. 1 to 6, the synchronization part 200 of the present invention includes a rack gear 210, a pinion gear 220, and the synchronization bar 230.

More specifically, the synchronization part 200 includes the rack gear 210 installed on each fixed rail 110, the pinion gear 220 rotatably installed on one side surface of each intermediate rail 120 and engaged with the rack gear 210, and the synchronization bar 230 of which one end portion and the other end portion are connected to the pinion gear 220.

The rack gear 210 is a gear in a linear type and is engaged with the pinion gear 220 to adjust a moving speed of a rail and prevent the rail from shaking left and right when the rail interlocked with the pinion gear 220 is moved in an inserting direction I or a withdrawing direction W.

The rack gear 210 does not need to be provided over an entire length of the fixed rail 110 and may be provided slightly longer than half of the length of the fixed rail 110 and mounted on the fixed rail 110.

Meanwhile, the rack gear 210 may include a rail insertion part 211 formed on one end portion in the inserting direction I to be fitted into and mounted on one side surface of the fixed rail 110 through a hollow 111 of the fixed rail 110. As a result, the synchronization part 200 may be easily attached to or detached from the slide rail 100, and assembly convenience and productivity of the pull-out system 1000 can be improved.

The pinion gear 220 is rotatably installed on one side surface of each intermediate rail 120 and is engaged with the rack gear 210, which is provided on the fixed rail 110, and moved.

The pinion gear 220 may include a first pinion member 221 fixed to the intermediate rail 120, and a second pinion member 222 of which one side is coupled to the first pinion member 221 and the other side is coupled to the synchronization bar 230.

In this case, a gear may be formed along a perimeter of at least one of the first pinion member 221 and the second pinion member 222.

A through-hole 221a is formed in the center of the first pinion member 221, a fixing pin is fitted into and coupled to the intermediate rail 120 through the through-hole, and thus the first pinion member 221 may be fixed to the intermediate rail 120.

The second pinion member 222 may be coupled to the first pinion member 221 through one side surface thereof. Further, the second pinion member 222 may be coupled to the synchronization bar 230 through a fitting groove 222a formed in the other side thereof.

Meanwhile, the pull-out system 1000 may further include a roller 121 and at least one wire part 300.

More specifically, the pull-out system 1000 may further include the roller 121 rotatably fastened to one side surface of the intermediate rail 120, and at least one wire part 300 of which an end of one side is fixed to the moving rail 130 and an end of the other side is fixed to the fixed rail 110 and which is disposed to surround a rotation shaft of the pinion gear 220 or the roller 121.

The wire part 300 may be fixed to the fixed rail 110 through a first retainer 113 and may be fixed to the moving rail 130 through a second retainer 131.

Meanwhile, a guide slit 223 around which the wire part 300 is wound may be provided between the first pinion member 221 and the second pinion member 222. With this configuration, the pinion gear 220 is fastened to the rack gear 210 in a state in which the wire part 300 is inserted into the guide slit 223 formed between the first pinion member 221 and the second pinion member 222, and thus separation of the wire part 300 can be prevented.

Meanwhile, when the moving rail 130 is withdrawn, the pinion gear 220 fixed to the intermediate rail 120 is also pulled through the wire part 300, the pinion gear 220 is moved along the rack gear 210, and thus the intermediate rail 120 is also withdrawn.

Conversely, when the moving rail 130 is inserted, the roller 121 fixed to the intermediate rail 120 is also pulled through the wire part 300, the pinion gear 220 is moved along the rack gear 210, and thus the intermediate rail 120 is also inserted.

Here, according to the working principle of a pulley, a moving distance of the moving rail 130 is twice as much as a moving distance of the intermediate rail 120. Accordingly, a length of the rack gear 210 may be provided as half of a conventional rack gear, and thus manufacturing costs can be reduced, and a moving distance of the pinion gear 220 can be reduced by half, thereby improving operability.

Figure 7:
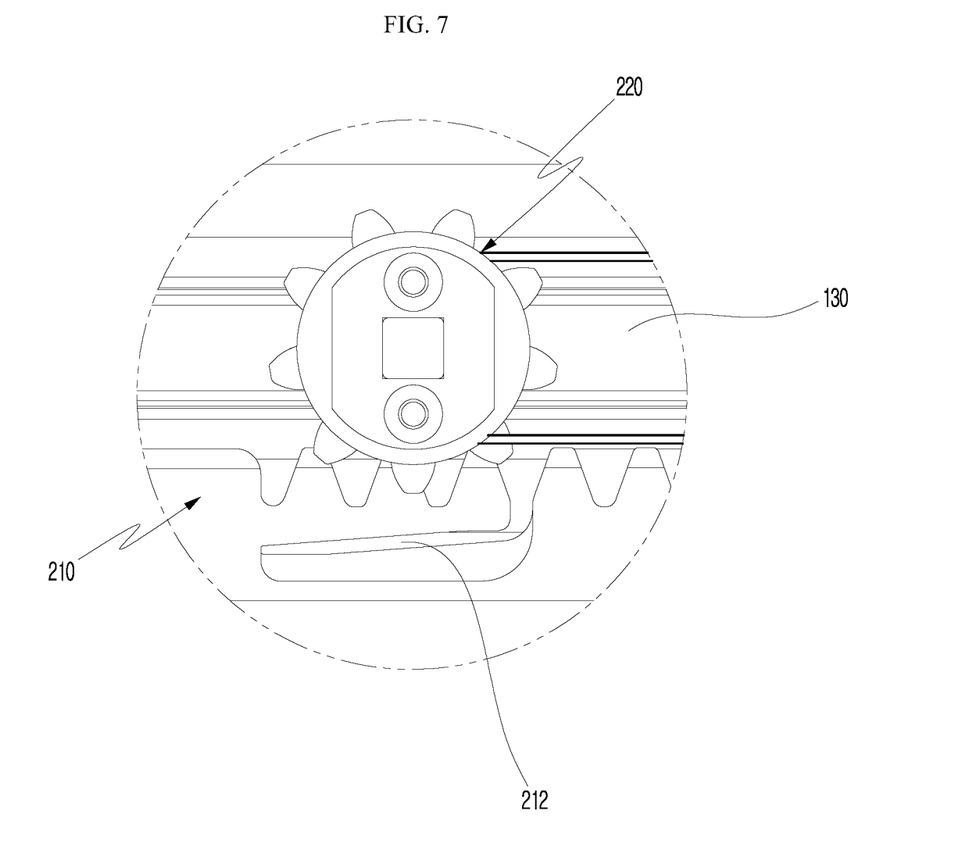
FIG. 7 is a view illustrating a tension unit of the rack gear according to an embodiment of the present invention.
Figure 8:
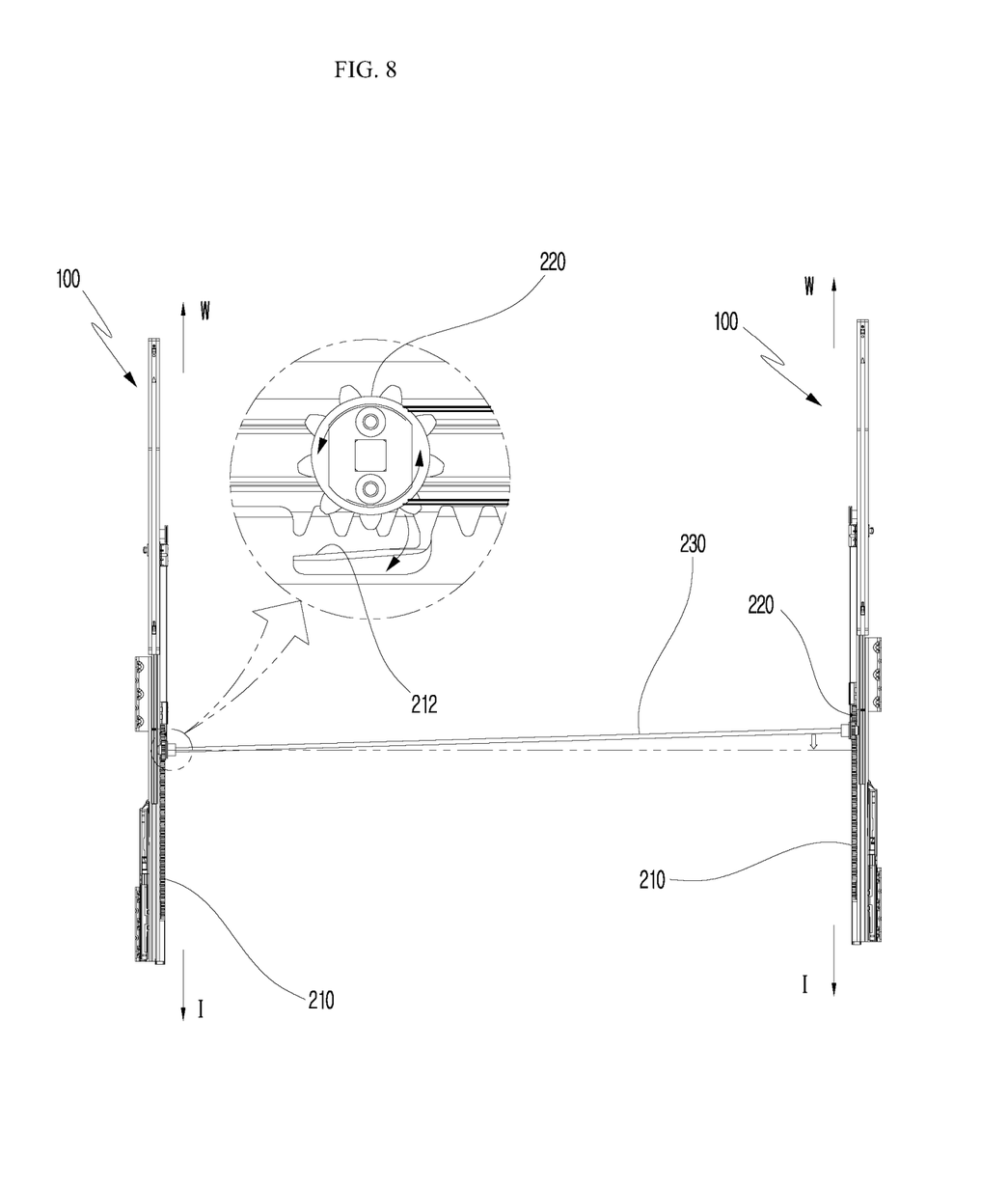
FIG. 8 is a view illustrating an operating principle of the tension unit according to an embodiment of the present invention.
Figure 9:
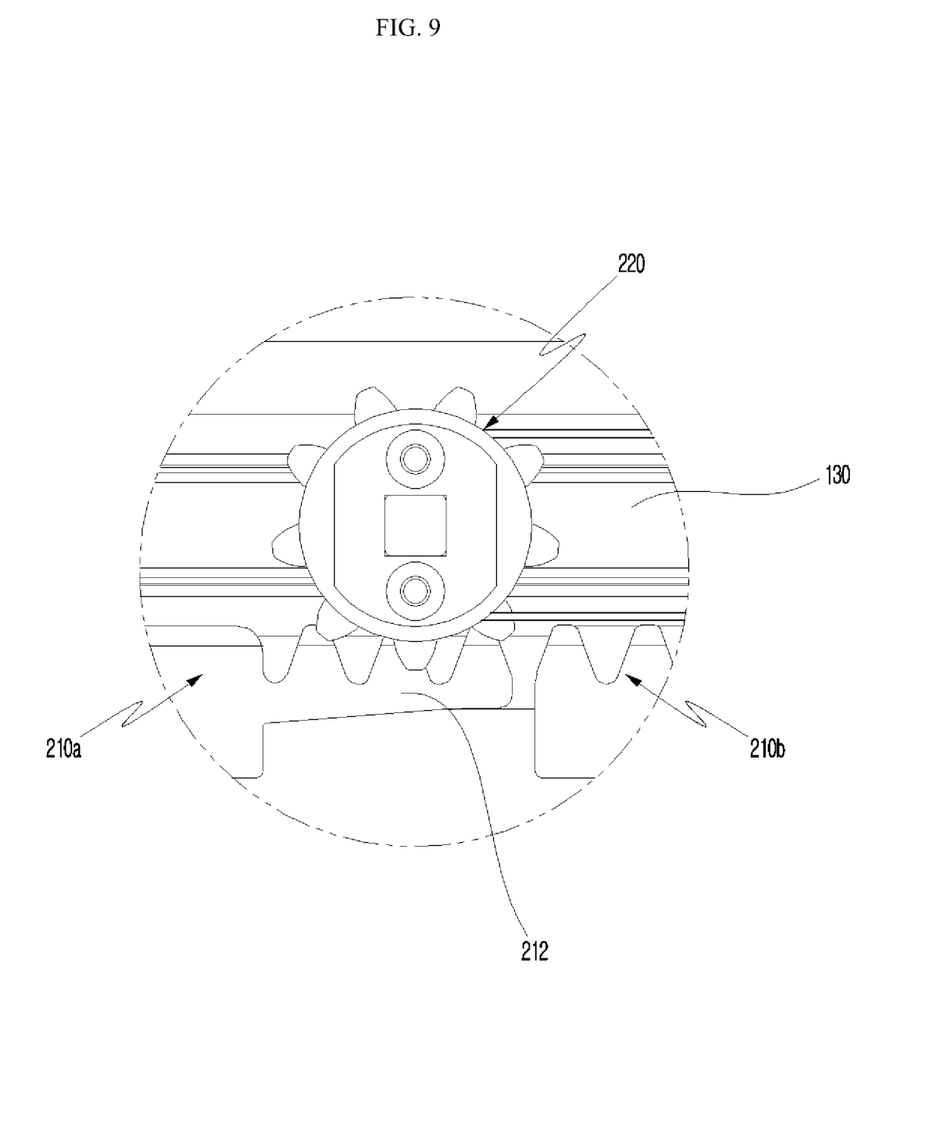
FIG. 9 is a view illustrating a tension unit of a rack gear according to another embodiment of the present invention.

FIG. 7 is a view illustrating a tension unit of the rack gear according to the embodiment of the present invention, FIG. 8 is a view illustrating an operating principle of the tension unit according to the embodiment of the present invention, and FIG. 9 is a view illustrating a tension unit of a rack gear according to another embodiment of the present invention.

Referring to FIGS. 7 and 8, the rack gear 210 of the present invention may include a tension unit 212 having an incised portion and configured to vertically elastically move a predetermined distance.

The tension unit 212 may be formed in an "L" shape by cutting a portion of an end of the rack gear 210 in the inserting direction I. That is, the tension unit 212 may have a cantilever structure in which one side of the tension unit 212 is connected to the rack gear 210 and the other side and a lower portion are incised.

In this case, the tension unit 212 applies a restoring force in an upward direction upon receiving a force in the direction of gravity, and prevents the pinion gear 220 from being arbitrarily separated from the rack gear 210 when the rack gear 210 and the pinion gear 220 are accurately engaged and moved.

Meanwhile, when the slide rails 100 at both sides are not synchronized, the tension unit 212 causes idling of the pinion gear 220 at one side during insertion so that synchronization realignment is performed. That is, in the case in which the pinion gear 220 at one side is misaligned and engaged with the rack gear 210, when the user applies a force to the slide rails 100 in the inserting direction I, the force is continuously applied to the pinion gear 220 and the rack gear 210. Accordingly, the tension unit 212 of the rack gear 210 is moved in a downward direction, and in this case, the pinion gear 220 is slightly lifted from the rack gear 210 and performs idling. As a result, as the pinion gear 220 at one side idles, the synchronization realignment of the slide rails 100 at both sides is performed.

The tension unit 212 may easily correct the pinion gear 220 of which one side is misaligned and engaged with the rack gear 210, and thus it is possible to prevent time delays in the assembly process and enable the user to perform self-maintenance on a product.

Referring to FIG. 9, a rack gear 210 may include a first rack gear 210a and a second rack gear 210b separated from each other, and the tension unit 212 may be formed by cutting a portion of the first rack gear 210a or the second rack gear 210b in an inserting direction I. That is, the tension unit 212 may have a cantilever structure in which one side of the tension unit 212 is connected to the first rack gear 210a or the second rack gear 210b and a part of a lower portion of the tension unit 212 is incised.

The above description of the present invention is only exemplary, and it will be understood by those skilled in the art that various modifications can be made without departing from the technical scope of the present invention and without changing essential features. Therefore, the above-described embodiments should be considered in a descriptive sense only and not for purposes of limitation. For example, each component described as a single type may be realized in a distributed manner, and similarly, components that are described as being distributed may be realized in a coupled manner.

The scope of the present invention is defined not by the detailed description but by the appended claims and encompasses all modifications or alterations derived from meanings, the scope, and equivalents of the appended claims.

REFERENCE NUMERALS

1000: PULL-OUT SYSTEM
100: SLIDE RAIL
110: FIXED RAIL
120: INTERMEDIATE RAIL
130: MOVING RAIL
200: SYNCHRONIZATION PART
210: RACK GEAR
220: PINION GEAR
230: SYNCHRONIZATION BAR
300: WIRE PART

The invention claimed is:

1. A pull-out system comprising:
at least two slide rails each having a fixed rail, an intermediate rail slidably disposed on the fixed rail, and a moving rail slidably disposed on the intermediate rail; and
a synchronization part configured to synchronize movement of each of the moving rails,
wherein the synchronization part includes:
a pinion gear rotatably installed on one side surface of each intermediate rail; and a synchronization bar of which one end portion and the other end portion are connected to each pinion gear, wherein the pull-out system further comprises:

a roller rotatably fastened to one side surface of the intermediate rail; and at least one flexible member of which an end of one side is fixed to the moving rail and an end of the other side is fixed to the fixed rail and which is disposed to surround a rotation shaft of the pinion gear or the roller.

2. The pull-out system of claim 1, wherein the synchronization part further includes: a rack gear installed on each fixed rail, wherein the pinion gear is enged with the rack gear.

3. The pull-out system of claim 2, wherein the rack gear includes a tension unit having an incised portion and configured to vertically elastically move a predetermined distance, and when the slide rails at both sides are not synchronized, the tension unit causes idling of each pinion gear at one side during insertion so that synchronization realignment is performed.

4. The pull-out system of claim 3, wherein the tension unit is formed in an "L" shape by cutting a portion of an end of the rack gear in an inserting direction.

5. The pull-out system of claim 3, wherein the rack gear includes a first rack gear and a second rack gear that are separated from each other, and the tension unit is formed so that one side is connected to the first rack gear or the second rack gear and a part of a lower portion is incised.

6. The pull-out system of claim 1, wherein the flexible member is a wire part.

7. The pull-out system of claim 1, wherein the pinion gear includes:

a first pinion member fixed to the intermediate rail; and a second pinion member of which one side is coupled to the first pinion member and the other side is coupled to the synchronization bar.

8. The pull-out system of claim 7, wherein a gear is formed along a perimeter of at least one of the first pinion member and the second pinion member.

9. The pull-out system of claim 7, wherein a guide slit around which the wire part is wound is provided between the first pinion member and the second pinion member.

10. The pull-out system of claim 2, wherein the rack gear further includes a rail insertion part formed on one end portion in the inserting direction to be fitted into and mounted on the fixed rail.

* * * * *